United States Patent [19]

Gardner

[11] Patent Number: 4,552,147
[45] Date of Patent: Nov. 12, 1985

[54] APPLICATOR FOR LIVESTOCK TAG

[76] Inventor: Michael S. Gardner, 108 Waiatarua Rd., Remuera, Auckland, New Zealand

[21] Appl. No.: 527,831

[22] Filed: Aug. 30, 1983

[30] Foreign Application Priority Data

May 16, 1983 [NZ] New Zealand ............. 204234

[51] Int. Cl.[4] ............................................. A01K 11/00
[52] U.S. Cl. .................................. 128/330; 227/144
[58] Field of Search ............... 128/330, 316, 329 R; 227/144, 67

[56] References Cited

U.S. PATENT DOCUMENTS

| | | | |
|---|---|---|---|
| 2,555,133 | 5/1951 | Horstmann | 128/329 R |
| 4,120,303 | 10/1978 | Villa-Massone et al. | 128/330 |
| 4,201,214 | 5/1980 | Whiteley | 128/330 |
| 4,368,735 | 1/1983 | Filmer | 128/330 |

Primary Examiner—Michael H. Thaler
Attorney, Agent, or Firm—Holman & Stern

[57] ABSTRACT

The invention relates to an applicator for a tag for use on livestock such as cattle, sheep, dogs and the like. The applicator includes at least two pivotally connected handle members which extend into upper and lower jaws. A pin mounting is pivotally connected to the upper jaw member, an elongate pin, to which an ear tag can be attached, being pivotally connected adjacent to one end of the pin mounting. A pin restraining housing is provided adjacent an end of the upper jaw member. The pin mounting normally urges at least part of the pin to be located within the pin restraining housing. The lower jaw member is formed or provided with an actuator such as in the form of a cam surface. On the handles and jaws being closed, the activator comes into contact with the pin mounting, this causing the pin mounting to pivot about its connection to the upper jaw member, allowing the pin to move out of the pin restraining housing. This permits the pin to pivot about and relative to its pivotal attachment to the pin mounting.

9 Claims, 4 Drawing Figures

APPLICATOR FOR LIVESTOCK TAG

BACKGROUND TO THE INVENTION

This invention relates to an applicator for ear tags for use with livestock, such as sheep, cattle, dogs and the like.

The present invention is particularly related to an applicator for applying tags of a substantially unitary or one-piece formation. Up until this time, in tags used for the identification of livestock, it has been common to use multiple piece tags or two piece tags, at least one of the pieces having a shaft which passes through the ear of the animal and which engages with another part of a tag, so that the tag is securely attached to and about an animal's ear.

Such two piece or multiple piece tags have a number of problems associated with them, in that they are prone to become disassembled and thus be removed from the ear of the animal, such as by the animal rubbing against a fence, brush, another animal or the like. Two piece or multiple piece tags are therefore not as efficient as they could be. Thus, where possible, it is advantageous to use a onepiece or unitary ear tag.

Such a one-piece ear tag for example includes a main body portion having an indicia section on which markings, numbers and the like can be placed. An elongate neck extends away from the main body portion and terminates in a head. The elongate neck and head are passed through a slit in the ear of the animal, so that the head (which is usually of a greater width than the neck and the slit in the ear of the animal), prevents the tag from being removed from the animal, while the indicia section hangs or stands free, relative to the ear of the animal.

Up until this time, with the use of two piece tags, numerous arrangements have been proposed for applying the tags to the ears. Arrangements have also been proposed for applying unitary or one piece tags to the ears of animals. Very few (if any) of the arrangements disclosed or used up until this time have been really successful or efficient in operation.

An example of an applicator for a two piece ear tag is disclosed in United States patent specification No. 4,185,635. This discloses an applicator which is relatively complicated and has a number of slidably moveable parts, for the purpose of locating a two piece ear tag. A further arrangement for applying two piece ear tags to the ear of an animal is disclosed in United Kingdom patent specification No. A2,044,684, this arrangement including an applicator having a pliers-type action and including a pin member which passes through the ear of the animal. This arrangement also discloses that the pin is able to pivot away and outwardly from, the a-plicator when the handles of the pliers type applicator are closed. Thus, once the pin is passed through the ear of the animal and the applicator is being opened, the pin member will pivot away from the ear. This diminishes the prospect of damage to an animal's ear, which can of course happen if an animal pulls or jerks its head (as is quite likely to happen) with the pain of the pin passing through the ear. Following the pin being passed through the ear therefore, the applicator causes the pin to be moved out of the slit or cut in the ear, the pivoting pin also being caused to pivot freely away from the ear. This arrangement has however been found to be particularly complicated in operation, and is also adapted for use with two piece ear tags.

The arrangement does not therefore readily lend itself to operation with a unitary or one piece ear tag.

A further applicator is disclosed in United States patent specification No. 4,201,214. This specification discloses an applicator for attaching ear tags to animals, again involving a pin or spear, which is able to move downwardly through the ear of an animal, following which it is capable of pivoting through an arc to move away from the ear of the animal. The arrangement disclosed in United States patent specification No. 4,201,214 is however complicated and not readily practical in operation. It has a substantial number of interconnected parts and the applicator as a unit does not lend itself to straight forward and efficient use on farms, ranches and the like, where large numbers of live stock must be tagged.

A further form of ear tag applicator referred to as a "cattle tagging gun" is described and disclosed in Australian patent specification No. 561,78/80. This specification also discloses an arrangement for tagging animals, and includes a tag carrier blade which is pivotally mounted to a tagging device and which is capable of pivoting in a direction away from the base of the device.

Both the arrangements of United States patent specification No. 4,201,214 and Australian patent specification No. 56178/80 have application to one piece or unitary tags. Both specifications disclose an arrangememt including a pin or blade, which is capable of pivoting away from the applicator and away from the ear of the animal, once it has passed through the ear of the animal and applied a tag. Both the arrangements disclosed however are not readily capable of being efficiently used, and are complicated and inefficient in operation. Additionally, they have not been totally satisfactory when used for applying tags to a large number of livestock, (such as is the case on large farms, ranches and the like). Additionally, the blades of the prior arrangements, have not always pivoted positively, and freely, which has presented problems.

As referred to hereinbefore, numerous ear tag applicators up until this time have involved the use of a pin or blade passing through the ear of the animal for use in applying a tag to the ear of an animal. In some cases these pins have been fixed and have not been capable of movement. Thus, if an animal is held still for the application of an ear tag, and a pin is passed through the ear of an animal, the resultant pain and distress to the animal will usually cause the animal to pull and jerk its head away from the applicator. Those arrangements that have disclosed a pivoting or swinging pin or blade have been complicated and have not lent themselves to straight forward and efficient use in the field. In particular they have not lent themselves to straight forward and efficient use when applying large numbers of one - piece or unitary ear tags, such as on large farms, ranches and the like.

SUMMARY OF THE INVENTION

The present invention sets out to provide a straight forward and efficient applicator for applying unitary or one-piece ear tags.

According to one aspect of this invention, there is provided an applicator for a livestock tag, including at least two pivotally connected handle members, extending into or being attached to first and second jaws; pin mounting means being pivotally connected to a first jaw member; an elongate pin being pivotally connected adjacent one end of said pin mounting means; a pin restraining housing being provided adjacent an end of said first jaw member; the pin mounting means normally urging at least part of said pin to be located within said pin restraining housing; the second jaw member being formed or provided with actuating means; the arrangement being such that on the handles and jaws being closed, the actuating means comes into contact with the pin mounting means, causing the pin mounting means to pivot about its connection with the first jaw member; such movement causing the pin to move out of the pin restraining housing, to thus permit the pin to pivot about and relative to its pivotal attachment to the pin mounting means.

According to a further aspect of this invention, there is provided an applicator for a livestock ear tag, including at least two pivotally connected first and second handle members, extending into and being attached to upper and lower jaw members; the handle and jaw members being normally spring biased into a position away from each other; pin mounting means being pivotally connected to the first jaw member; an elongate pin being pivotally connected at or adjacent an end of said pin mounting means; a pin restraining housing being provided at or adjacent an end of the first jaw member; spring means extending between said first jaw member and an adjacent surface of said pin mounting means, so as to normally urge said pin mounting means into a position in which at least part of said pivotally connected pin is located and housed within said pin restraining housing; an inner surface of said second jaw member being formed or provided with actuating means; the arrangement being such that on said handle members and said jaw members being brought together, the actuating means of the second jaw member will come into contact with at least part of said pin mounting means, so as to compress said spring between the first jaw member and said pin mounting means, said pin mounting means being thereby caused to pivot about its connection to the first jaw member, this causing at least part of the pivotally connected pin to move out of, and be released from, the pin restraining housing, so as to permit pivotal movement of said pin about and relative to, said pin mounting means.

BRIEF DESCRIPTION OF DRAWINGS

The invention will now be described by way of example only, and with reference to the accompanying drawings, wherein.

DESCRIPTION OF PREFERRED EMBODIMENTS

The invention is now described by way of example only and with reference to the accompanying drawings. Preferably, the applicator of the present invention is formed in any appropriate material, such as metal, hardened plastics and the like. It is however preferred that the invention be basically constructed of a metal material, although any appropriate material can be used to advantage.

Figure 4:
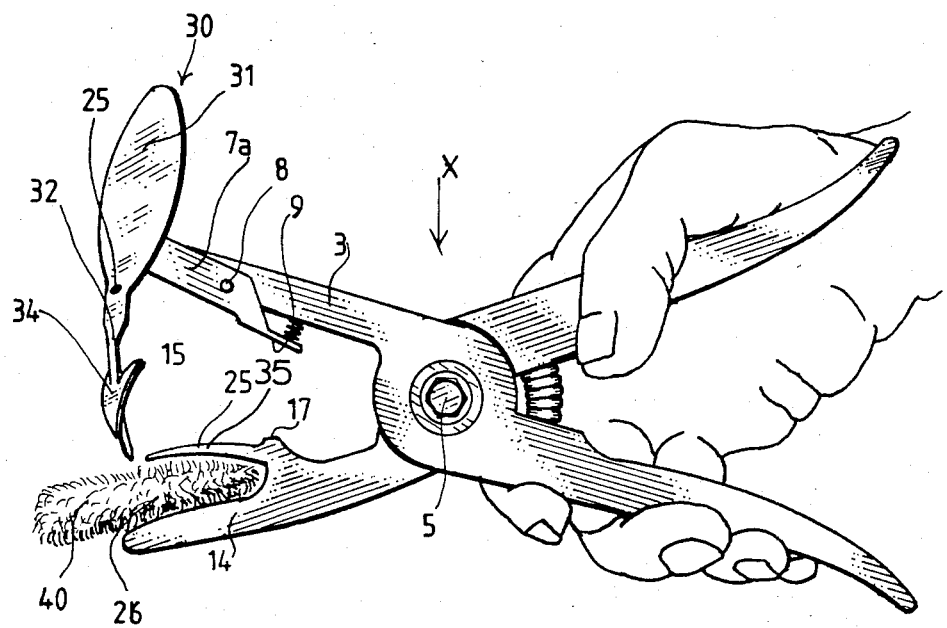
FIG. 4: is a view of an applicator showing a unitary or one piece ear tag mounted thereon, ready for application.

The invention has particular advantage when used in applying a substantially unitary or one-piece ear tag such as shown by way of example in FIG. 4 of the drawings. Such a tag 30 is shown attached to the pin 15 of an applicator "X", the tag 30 being formed of a suitable resilient material such as plastic and the like. The tag 30 has a main body portion 31 which is capable of carrying indicia or numbering and the like. This leads into a neck portion 32 which extends into a head 34. The head is preferably wider than and extends outwardly from the neck 32. Suitable holes 25 are provided in the body portion and head portion of the tag 30, to engage over location means, such as locating pins which can extend outwardly from an outer surface of the pin 15. This then allows the tag 30 to be located on the pin 15, so as to be passed through the ear 40 of an animal (as will be described hereinafter).

The applicator "X" of the present invention includes first and second handle members 1 and 2, which lead into or are connected to elongate and spaced apart jaw members 3 and 4. It is preferred that the handle member 1 and jaw member 3 and the handle member 2 and the jaw member 4 be integrally formed one with the other.

The handles and jaws are pivotally connected one to the other, such as by a suitable pivoting connection in the form of a bolt or some other appropriate connection, the pivotal connection being shown at 5 in the accompanying drawings. Thus, the handles and jaws are pivotally connected one to the other, so that they are capable of being pivotally opened and closed in a substantially "pliers" like operation.

Figure 1:
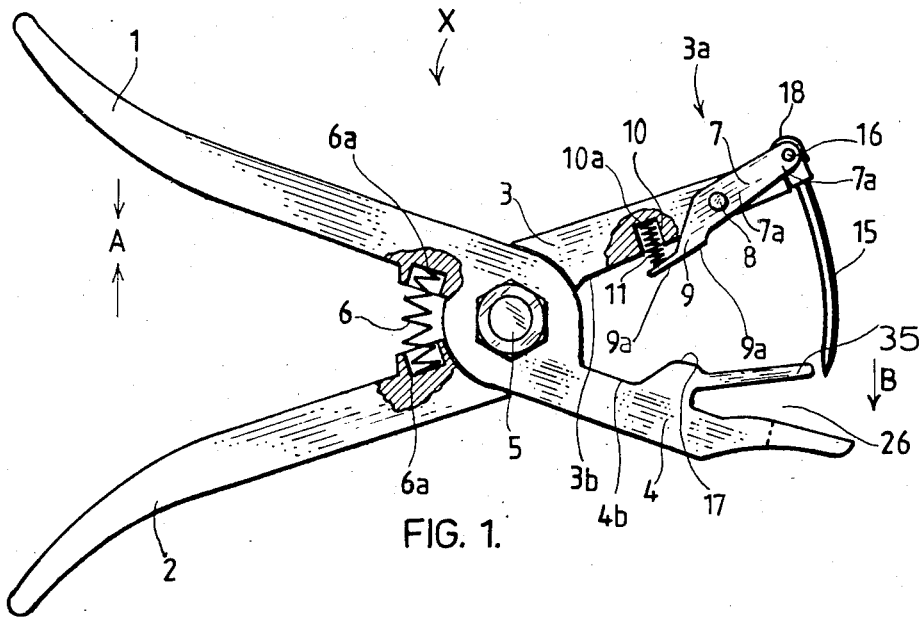
FIG. 1: is a side view of an applicator according to one form of the invention in an open positon.
Figure 2:
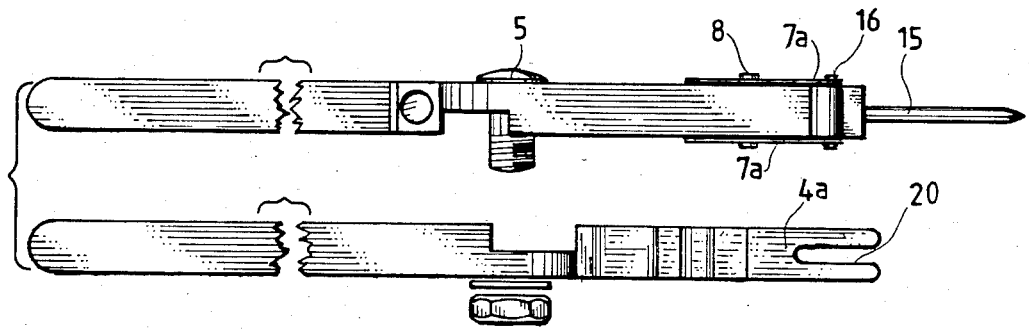
FIG. 2: is an exploded plan view of an applicator according to one form of the present invention.

Spring means in the form of a spring 6 is provided between the handles 1 and 2, and adjacent the pivotal connection 5, the spring 6 normally urging the handle members 1 and 2 and jaw members 3 and 4 away from each other. Thus, they are normally maintained in an open position (as shown in FIG. 1 of the drawings).

Inner surfaces of the handle members 1 and 2, adjacent the pivotal connection, are provided with spring housing members or recessed portions 6a in to which the ends of the spring 6 are located. In order to operate the applicator of the present invention and so as to close the jaw members 3 and 4 relative to each other, the handle members 1 and 2 must be gripped (such as shown in FIG. 4 of the drawings) and an inward or closing pressure applied thereto (such as in the direction of arrows "A" in FIG. 1 of the accompanying drawings). This then compresses the spring 6 against its normal bias, and causes the jaws 3 and 4 to move towards one another into a closed position (as shown for example in FIG. 3 of the drawings).

The jaw members 3 and 4 are elongate in formation.

The first or upper jaw member 3 has attached thereto, a pin mounting member 7. The pin mounting member 7 has arms 7a on each side of the jaw member 3, and a pivot pin 8 passes through the sides 7a and the jaw member 3, so that the pin mounting member 7 is able to pivot relative to the jaw member 3.

The rear end of the pin mounting member 7 is stepped or angled downwardly into a base formation or base member 9 which extends underneath the jaw 3 and connects end sections of the side members 7a of the pin mounting member 7. The underside of the base 9 is provided with a substantially flat or planar underside 9a.

Rearwardly of the front or forward end of the jaw member 3 (and preferably substantially medially thereof), a spring location bore or hole 10 is provided, and a spring 11 is located therewithin. The spring 11 abutts against the inner surface or base 10a of the bore 10 and also extends against the base member 9 of the pin mounting means 7. The spring 10 is biased so that it urges the base 9 and pin mounting member 7 away from the underside 3b of the jaw member 3.

At or adjacent the distal end 3a of the pin mounting member 7, an elongate pin 15 is pivotally mounted between the side members 7a for example by a pivot pin 16.

The pin 15 is formed of an appropriate material such as metal, and is in the form of a elongate pin or blade 15 which is preferably sharpened at its far or distal end, so as to be capable of passing through an ear of an animal.

The end of the jaw member 3 is formed or provided with a pin housing or restraining member 18, which is preferably in the form of an open ended housing, which is open from the underside. For example, the housing 18 is in the form of a flattened or rounded, substantially inverted U-shape, which is attached to or integrally formed with the end of the jaw member 3. The housing member 18 extends upwardly slightly from the normal upper surface of the jaw member 3.

The housing 18 is so shaped and sized, that it is able to receive and accommodate least an end 15a of the pin member 15.

Referring further to FIG. 1 of the accompanying drawings, it should be appreciated that the spring bias of the spring 11, pressing or urging against the base 9 of the pin mounting member 7 causes the distal end of the pin mounting member 7 (and the pin 15 pivotally mounted on the pivot pin or shaft 16 extending between the side members 7a), to move upwardly in response to the urging of the spring 11, so that the upper end 15a of the pin 15 is urged into and held in a position within the housing 18.

The second or lower jaw member 4 is formed with a forward lip 4a which has an elongate slot or opening 20 therein, so that when the pin 15 passes downwardly through the ear of an animal, it is also able to pass through the slot 20 (as will be described hereinafter).

The inner surface of the lower jaw member 4 is formed or provided with a stepped actuating member of cam surface 17 which is stepped outwardly and inwardly of the normal inner surface 4b of the jaw member 4. Thus, the stepped actuating member or cam face 17 forms an abutment member in use (as will be described hereinafter).

The lower jaw 4 is provided with an integrally formed lip member 25, extending out from the abutment member 17 and defining a slot or space 26, in which an animals ear 40 can be located in use.

In use, when it is desired to apply a tag 30 to an ear 40 of an animal, the ear 40 can be located within the space or recess 26. The handles 1 and 2 are gripped (as shown in FIG. 4 of the drawings), and are brought together against the urging of the spring 6. This in turn brings the jaws 3 and 4 together and the pin 15 will move downwardly through the ear 40 of an animal, at the same time taking the ear tag 30 with it. Having passed through the ear of the animal, the pin 15 will pass through the slot 20 in the jaw member 4.

The closure of the jaw members 3 and 4 will also bring the abutment surface of the actuating member 17 into contact with the face 9a of the pin mounting member 7. This contact (and continued closure of the jaw members 3 and 4), will cause the spring 11 to be compressed within the spring housing 10, this being caused by the actuating member 17 moving against the underside 9a of the base 9 of the pin mounting member, which in turn is caused to pivot about its pivot point 8. As this closure and pressure continues, the pivotal connection of the pin mounting member 7 to the upper jaw member 3, will cause the side members 7a of the pin mounting member 7 to be pivoted downwardly and away from their normal position or orientation (as shown for example in FIG. 1 of the drawings). This movement will in turn move the end 15a of the pin 15 out of engagement within the pin restraining housing 18, so that the pin will be free to pivot about its pivot point 16.

Figure 3:
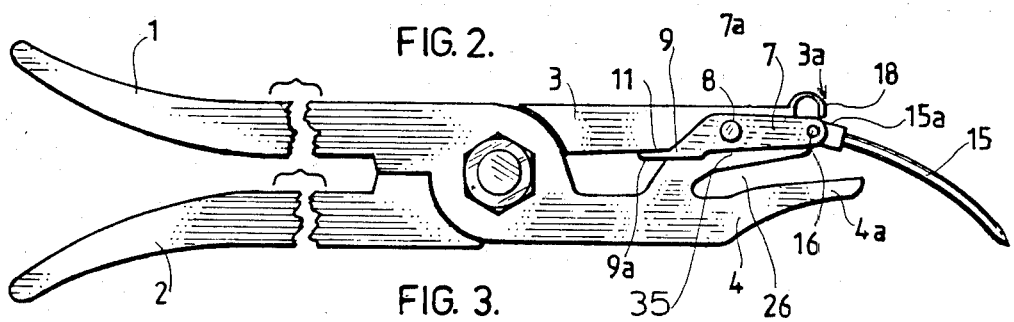
FIG. 3: is a side view of an applicator of the present invention shown in its closed position.

The applicator in a closed position and with the pin freely pivoting, is shown by way of example only, in FIG. 3 of the drawings. This also shows the spring 11 in a compressed state, with the actuating means 17 in position against the underside 9a of the base 9 of the pin mounting member 7.

It will be appreciated therefore, that on the pin 15 having taken the ear tag 30 through the ear, (such as in the direction of the arrow "B" in FIGS. 1 and 4 of the accompanying drawings), and on the head 34 of the tag 30 engaging on a reverse side of the ear, the pin 15 is free to move out of the slit or cut it will have formed in the ear of the animal, and to freely pivot about its pivotal connection 16 relative to the pin mounting member 7. Thus, it is able to freely pivot outwardly and away from the applicator, and from the ear of the animal, such as to release itself from the ear of an animal. In particular, this is the case should an animal "jerk", "pull" or violently move its head during use. This then overcomes the problems associated with fixed pins used up until this time and also provides a straight forward and efficient arrangement in comparison with some of the arrangements disclosed up until this time.

On pressure being released from the handles 1 and 2 (and the jaw members 3 and 4) they will be able to return to their position of rest (substantially as shown in FIG. 1 of the drawings). This will be in accordance with the urging of the springs 6 and 11. Thus, the end 15a of the pin 15 will then be caused to return to its restrained and housed position of rest within the housing 18. This then returns the arrangement to a position substantially as shown in FIG. 1 of the drawings, ready for further use.

It should be appreciated that the invention has been described by way of example only, and that improvements and modifications may be made to the invention without departing from the scope or spirit thereof, as defined by the appended claims.

I claim:

1. An applicator for a livestock tag, including at least two pivotally connected handle members, extending into or being attached to first and second jaws; pin mounting means being pivotally connected to a first jaw member; an elongate pin being pivotally connected adjacent to an end of said pin mounting means; a pin restraining housing being provided adjacent to an end of said first jaw member; spring biasing means connected between the pin mounting means and the first jaw member for normally urging at least an upper part of said pin to be located within said restraining housing for precluding pivotal movement of the pin; the second jaw member having actuating means for contacting the pin mounting means when the jaws are closed and causing the pin mounting means to pivot about its connection with the first jaw member against the action of the biasing means; such movement causing the pin to move out of the pin restraining housing to thus permit the pin to pivot about and relative to, its pivotal attachment to the pin mounting means.

2. An applicator as claimed in claim 1, wherein the handle members are pivotally connected one to the other; spring means being provided so that the handle members and jaws are spring biased into a position into which they are normally spaced apart one from the other.

3. An applicator as claimed in claim 1, wherein the pin mounting means includes two spaced apart side members, one on either side of said first jaw member; pivot means passing through said side members and through said first jaw member, so that the pin mounting means is capable of pivotal movement relative to said first jaw member.

4. An applicator as claimed in claim 1, wherein the pin mounting means includes two spaced apart side members, one on either side of said first jaw member; pivot means passing through said side members and through said first jaw member, so that the pin mounting means is capable of pivotal movement relative to said first jaw member; the side members being stepped downwardly into a base formation which extends between said side members and below said first jaw member; spring means extending between an underside of the first jaw member and an upper surface of said base formation so as to normally urge the base formation and pin mounting means away from the underside of said first jaw member.

5. An applicator as claimed in claim 1, wherein the upper end of the pin is pivotally mounted to the pin mounting means by a pivot pin extending between side members of the pin mounting means.

6. An applicator as claimed in claim 1, wherein the pin restraining housing is in the form of an open sided housing extending outwardly of an end of said first jaw member.

7. An applicator as claimed in claim 1, wherein said actuating means if formed as a raised cam portion on an upper surface of the second jaw member.

8. An applicator as claimed in claim 1, wherein said second jaw member is formed with a spaced apart lip portion defining a recess for location of an animals ear.

9. An applicator for a livestock ear tag, including at least two pivotally connected handle members, extending into and being attached to upper and lower jaw members, the handle and jaw members being normally spring biased into a position away from each other; pin mounting means being pivotally connected to the upper jaw member; an elongate pin being pivotally connected at or adjacent an end of said pin mounting means; a pin restraining housing being provided at or adjacent an end of the upper jaw member; spring means extending between the upper jaw member and an adjacent surface of the pin mounting means, so as to normally urge the pin mounting means into a position in which at least part of said pivotally connected pin is located and housed within said pin restraining housing; an upper surface of said lower jaw member being formed or provided with actuating means; the arrangement being such that on said handle members and said jaw members being brought together, the actuating means of the lower jaw member will come into contact with at least part of said pin mounting means, so as to compress said spring between the upper jaw member and the pin mounting means; said pin mounting means being thereby caused to pivot abouts its connection to the upper jaw member, this causing at least part of the pivotally connected pin to move out of, and be released from, the pin restraining housing, so as to permit pivotal movement of said pin about and relative to said pin mounting means.

* * * * *